(12) United States Patent
Kim et al.

(10) Patent No.: US 12,452,485 B2
(45) Date of Patent: Oct. 21, 2025

(54) ELECTRONIC DEVICE, SYSTEM, AND METHOD FOR INTELLIGENT HORIZONTAL-VERTICAL IMAGE TRANSFORM

(71) Applicant: KOREA ELECTRONICS TECHNOLOGY INSTITUTE, Seongnam-si (KR)

(72) Inventors: Sung Jei Kim, Seoul (KR); Jin Woo Jeong, Seoul (KR); Seung Ho Lee, Anyang-si (KR); Hyeon Cheol Moon, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 12 days.

(21) Appl. No.: 18/576,912

(22) PCT Filed: Feb. 14, 2022

(86) PCT No.: PCT/KR2022/002166
§ 371 (c)(1),
(2) Date: Jan. 31, 2024

(87) PCT Pub. No.: WO2023/282425
PCT Pub. Date: Jan. 12, 2023

(65) Prior Publication Data
US 2024/0314390 A1    Sep. 19, 2024

(30) Foreign Application Priority Data
Jul. 6, 2021  (KR) .................. 10-2021-0088393

(51) Int. Cl.
*H04N 21/4402* (2011.01)
*H04N 21/234* (2011.01)
*H04N 19/70* (2014.01)

(52) U.S. Cl.
CPC ............. *H04N 21/440272* (2013.01); *H04N 21/23418* (2013.01); *H04N 19/70* (2014.11)

(58) Field of Classification Search
None
See application file for complete search history.

(56) References Cited

U.S. PATENT DOCUMENTS 11,049,523 B1 *   6/2021  Puri ................. H04N 21/23424
12,069,323 B2 *   8/2024  Shintani ............ H04N 21/2353
(Continued)

FOREIGN PATENT DOCUMENTS

CN    106454407 A  *  2/2017  ..... H04N 21/234372
CN    108965711 A  *  12/2018 ........ H04M 1/72563
(Continued)

OTHER PUBLICATIONS

International Search Report and Written Opinion mailed Jan. 31, 2023 in International Application No. PCT/KR2022/002166, in 10 pages. (English translation of ISR.).

(Continued)

*Primary Examiner* — William J Kim
(74) *Attorney, Agent, or Firm* — Knobbe, Martens, Olson & Bear, LLP

(57) ABSTRACT

Proposed is an electronic device, a system, and a method for intelligent horizontal-vertical image conversion. The device may transmit a bitstream containing information on an image having a first image ratio that is longer horizontally than vertically to a terminal to enlarge and reproduce the image when the terminal has a screen ratio state that is longer vertically than horizontally. The device may include an analysis controller for analyzing contents of a corresponding frame image to calculate a corresponding reproduction area. The device may also include a selection controller for separating the image into a plurality of sub- (Continued)

units, and selecting an optimal artificial intelligence (AI) model applied for each subunit according to the contents of the image within the corresponding subunit from among a plurality of previously trained AI models. The device may further include a generation controller for generating the bitstream, the reproduction area, and the optimal AI model.

15 Claims, 10 Drawing Sheets

(56) References Cited

U.S. PATENT DOCUMENTS

| | | | | |
|---|---|---|---|---|
| 2002/0089523 | A1* | 7/2002 | Hodgkinson | H04N 21/440272 |
| | | | | 348/E5.111 |
| 2003/0189669 | A1* | 10/2003 | Bowser | H04N 21/488 |
| | | | | 348/E5.1 |
| 2004/0012724 | A1* | 1/2004 | Jang | H04N 21/4622 |
| | | | | 348/739 |
| 2004/0189864 | A1* | 9/2004 | Topper | H04N 21/4341 |
| | | | | 348/556 |
| 2006/0061687 | A1* | 3/2006 | Dunton | H04N 21/4355 |
| | | | | 348/556 |
| 2010/0299627 | A1* | 11/2010 | Kenagy | G06T 3/40 |
| | | | | 715/790 |
| 2015/0304593 | A1* | 10/2015 | Sakai | G09G 5/36 |
| | | | | 348/565 |
| 2017/0013231 | A1* | 1/2017 | Kwon | H04N 21/4363 |
| 2019/0208281 | A1* | 7/2019 | Niebres | H04N 21/42202 |
| 2020/0275132 | A1* | 8/2020 | Kanoh | B60K 35/00 |
| 2020/0296317 | A1* | 9/2020 | Post, Jr. | H04N 7/0122 |
| 2020/0296462 | A1* | 9/2020 | Post, Jr. | H04N 7/0122 |
| 2020/0304836 | A1* | 9/2020 | Li | H04N 19/70 |
| 2020/0366973 | A1* | 11/2020 | Pachauri | G11B 27/031 |
| 2022/0191561 | A1* | 6/2022 | Hinds | H04N 21/234336 |
| 2024/0056617 | A1* | 2/2024 | Shintani | H04N 21/2353 |
| 2024/0073455 | A1* | 2/2024 | Chen | H04N 19/66 |

FOREIGN PATENT DOCUMENTS

| | | | | |
|---|---|---|---|---|
| CN | 110691259 A | * | 1/2020 | H04N 21/23418 |
| CN | 110839174 A | * | 2/2020 | |
| CN | 111372126 A | * | 7/2020 | H04N 21/440272 |
| CN | 108965711 B | * | 12/2020 | H04M 1/72563 |
| CN | 112565839 A | * | 3/2021 | H04N 21/4122 |
| KR | 10-2018-0097106 A | | 8/2018 | |
| KR | 10-2019-0088406 A | | 7/2019 | |
| KR | 10-2106103 B1 | | 5/2020 | |
| WO | WO-2020073860 A1 | * | 4/2020 | G06T 7/11 |

OTHER PUBLICATIONS

Jung et al., "Displaying game screen with same aspect ratio in various resolution of mobile devices", Journal of Korea Game Society, vol. 16, No. 5, pp. 99-109, Oct. 2016.

Tech Recipe, "AI Tool That Changes the Ratio of Video Screens Right Away", Mar. 4, 2020, retrieved on Jan. 27, 2023 from https://techrecipe.co.kr/posts/14766.

* cited by examiner

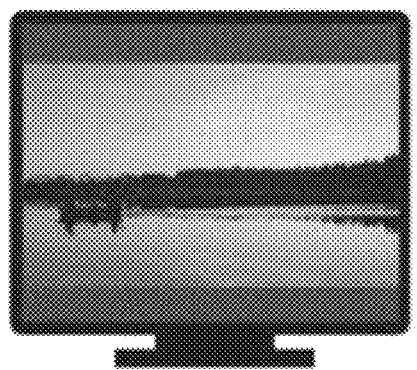
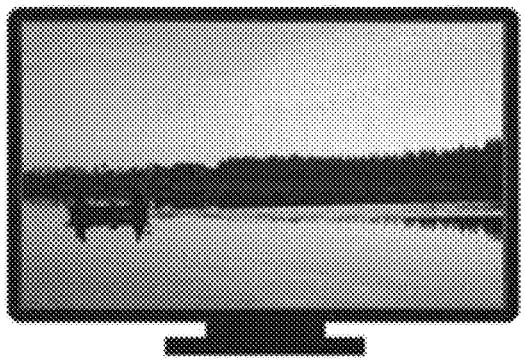
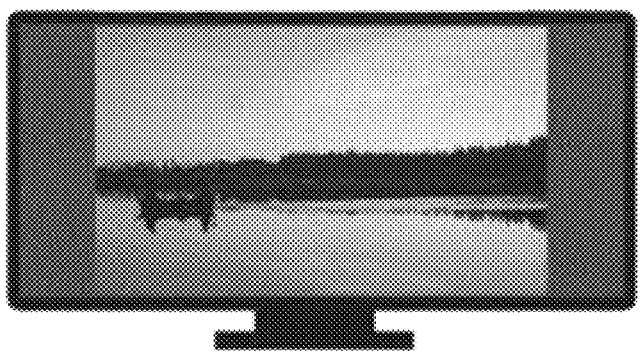
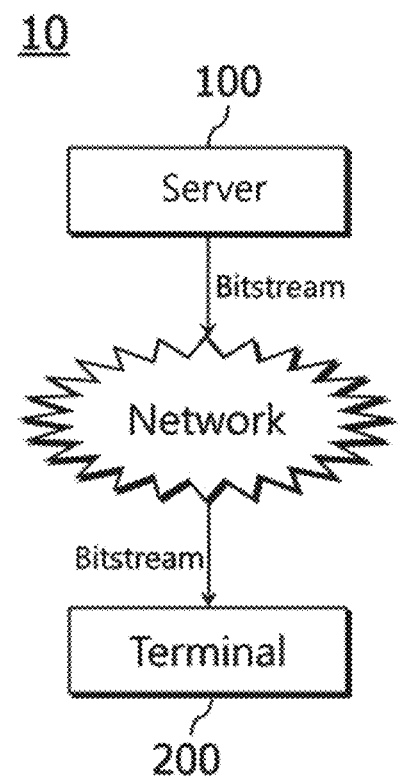
FIG. 1
FIG. 2

ELECTRONIC DEVICE, SYSTEM, AND METHOD FOR INTELLIGENT HORIZONTAL-VERTICAL IMAGE TRANSFORM

CROSS REFERENCE TO RELATED APPLICATIONS

The present application is a U.S. national phase application under 35 U.S.C. § 371 of International Application No. PCT/KR2022/002166, filed on Feb. 14, 2022, which claims the benefit of Korean Patent Application No. 10-2021-0088393 filed on Jul. 6, 2021 in the Korean Intellectual Property Office, the entire disclosure of each of which is incorporated herein by reference.

TECHNICAL FIELD

The present invention relates to an electronic device, a system, and a method related to video reproduction, and more particularly, to an electronic device, a system, and a method for intelligent horizontal-vertical image conversion technology that adaptively transforms the resolution of an image when reproducing a video (hereinafter referred to as an "image") having a horizontally long image ratio on a terminal in a vertically long screen ratio state.

BACKGROUND

According to a conventional screen ratio conversion technology (hereinafter, referred to as a "conventional technology"), when a terminal reproduces an image, the image is reproduced with a maximum size according to the size of the screen ratio (i.e., the ratio between the horizontal and vertical of the terminal screen) while maintaining the image ratio (i.e., the ratio between the horizontal and vertical of the image source).

FIG. 1 shows examples of a terminal with various screen ratios to which the conventional technology is applied to reproduce an image with a 16:9 image ratio.

Accordingly, when the conventional technology is applied, an empty space is generated on the upper and lower or left and right sides of the terminal screen, and the empty space is treated in black. In other words, referring to FIG. 1, when a terminal having a 4:3 screen ratio reproduces an image having a 16:9 image ratio, a black image called a letter box is inserted into an empty space generated above and below the terminal screen. In addition, when a 16:9 image ratio is reproduced on a terminal with a 21:9 screen ratio, a black image called a pillar box is inserted into an empty space generated on the left and right of the terminal screen.

In other words, since the conventional technology is only a technology of maintaining the video ratio and reproducing it according to the screen of the terminal, when the screen ratio of the terminal does not match the image ratio, there is a problem in that the visual satisfaction of the user is lowered due to excessive use of the letter box or the pillar. In particular, in the case where the screen state of the terminal to which the conventional technology is applied is a vertical state (a state in which the screen ratio of the terminal is longer vertically than horizontally), if a horizontal image (an image with an image ratio that is longer horizontally longer than vertically) is reproduced, the horizontal image is reduced and reproduced according to the corresponding screen ratio, which makes these problems more pronounced.

SUMMARY OF THE INVENTION

Technical Problem

In order to solve the problems of the related art, the present invention is directed to providing an intelligent horizontal-vertical image conversion technology that adaptively transforms the resolution of an image when reproducing an image having a horizontally long image ratio on a terminal in a long screen ratio state.

The technical problems to be achieved in the present invention are not limited to the technical problems mentioned above, and other technical problems not mentioned will be clearly understood by those of ordinary skill in the art from the following description.

Technical Solution

In order to solve the above problems, the electronic device according to an embodiment of the present invention is an electronic device that transmits a bitstream containing information on an image having a first image ratio that is longer horizontally than vertically to a terminal to enlarge and reproduce the image when the terminal has a screen ratio state that is longer vertically than horizontally, the electronic device including: an Analysis controller for analyzing contents of a corresponding frame image for each frame of the image to calculate a reproduction area corresponding to a part of the corresponding frame image; a Selection controller for separating the image into a plurality of subunits, and selecting an optimal AI model applied for each subunit according to the contents of the image within the corresponding subunit from among a plurality of AI models previously trained for each type of contents of the image; and a generation controller for generating the bitstream including information on the image, the reproduction area, and the optimal AI model, respectively.

The terminal may separate information on an image, a reproduction area, and an optimal AI model from the received bitstream, respectively, extract an image having a second image ratio that is longer vertically than horizontally for each frame from the separated image information based on the separated reproduction area information, and apply the AI model according to the separated optimal AI model information for each subunit to enlarge and reproduce the extracted image having the second image ratio.

The Analysis controller may detect areas for an object and a face in each frame image, respectively, and calculate a maximum reproduction area including the detected area, and calculate at least one reproduction area having a second image ratio longer vertically than horizontally through a cutting process for the calculated maximum reproduction area.

The maximum reproduction area may be an area including all of the detected areas when there is a plurality of said detected areas.

The Analysis controller may calculate a plurality of said reproduction areas, and each reproduction area may have a different ratio of the second image ratio.

The terminal may separate information on the image, the reproduction area, and the optimal AI model from the received bitstream, respectively, extract the image having the second image ratio for each frame from the separated image information based on the reproduction area information that is most similar to the screen ratio of the terminal among the plurality of separated reproduction area information, and apply the AI model according to the separated optimal AI model information for each subunit to enlarge and reproduce the extracted image having the second image ratio.

Each of the AI models may be one trained to generate an enlarged image with improved image quality from low-quality images of different contents according to a machine learning technique.

The optimal AI model may perform image quality improvement of at least one of resolution increase, noise removal, and dynamic range increase.

The generation controller may generate the bitstream to include information on the reproduction area and the AI model in supplemental enhancement information (SEI) of the Network Abstraction Layer (NAL).

The terminal may reproduce the enlarged image in all pixels of the screen.

The information on the optimal AI model included in the bitstream may be actual data on the optimal AI model or index data on the optimal AI model.

A system according to an embodiment of the present invention is a system including: a server that transmits a bitstream containing information on an image having a first image ratio longer horizontally than vertically, and a terminal that enlarges and reproduces the image in a screen ratio state longer vertically than horizontally.

The server may include: an Analysis controller for analyzing contents of a corresponding frame image for each frame of the image to calculate a reproduction area corresponding to a part of the corresponding frame image; a Selection controller for separating the image into a plurality of subunits, and selecting an optimal AI model applied for each subunit according to the contents of the image within the corresponding subunit from among a plurality of AI models previously trained for each type of contents of the image; and a generation controller for generating the bitstream including information on the image, the reproduction area, and the optimal AI model, respectively.

The terminal may separate information on an image, a reproduction area, and an optimal AI model from the received bitstream, respectively, extract an image having a second image ratio that is longer vertically than horizontally for each frame from the separated image information based on the separated reproduction area information, and apply the AI model according to the separated optimal AI model for each subunit to enlarge and reproduce the extracted image having the second image ratio.

An electronic device according to another embodiment of the present invention that enlarges and reproduces an image having a first image ratio that is longer horizontally than vertically in a screen ratio state that is longer vertically than horizontally, includes: an Analysis controller for analyzing contents of a corresponding frame image for each frame of the image to calculate a reproduction area corresponding to a part of the corresponding frame image; a Selection controller for separating the image into a plurality of subunits, and selecting an optimal AI model applied for each subunit according to the contents of the image within the corresponding subunit from among a plurality of AI models previously trained for each type of contents of the image; an Extraction controller for extracting, from the image based on the reproduction area for each frame, an image having a second image ratio longer vertically than horizontally; and a Conversion controller for enlarging and converting an image having a second image ratio extracted by applying a selected optimal AI model for each subunit.

A method, according to an embodiment of the present invention, performed by an electronic device that transmits a bitstream containing information on an image having a first image ratio that is longer horizontally than vertically to a terminal to enlarge and reproduce the image when the terminal has a screen ratio state that is longer vertically than horizontally, includes: analyzing contents of a corresponding frame image for each frame of the image to calculate a reproduction area corresponding to a part of the corresponding frame image; separating the image into a plurality of subunits, and selecting an optimal AI model applied for each subunit according to the contents of the image within the corresponding subunit from among a plurality of AI models previously trained for each type of contents of the image; and generating the bitstream including information on the image, the reproduction area, and the optimal AI model, respectively.

A method, according to an embodiment of the present invention, performed in an electronic device that enlarges and reproduces an image having a first image ratio that is longer horizontally than vertically in a screen ratio state that is longer vertically than horizontally, includes: analyzing contents of a corresponding frame image for each frame of the image to calculate a reproduction area corresponding to a part of the corresponding frame image; separating the image into a plurality of subunits, and selecting an optimal AI model applied for each subunit according to the contents of the image within the corresponding subunit from among a plurality of AI models previously trained for each type of contents of the image; and extracting, from the image based on the reproduction area for each frame, an image having a second image ratio longer vertically than horizontally, and enlarging and converting an image having a second image ratio extracted by applying a selected optimal AI model for each subunit.

Advantageous Effects

According to the present invention configured as described above, when a first image ratio image (horizontal image) is reproduced on a terminal screen in a vertical state, information in unnecessary areas of the image can be removed and only the portion corresponding to the main area of interest can be enlarged, and in some cases, new screen ratio conversion technology can be provided that allows reproduction to be enlarged to full screen.

In particular, according to the present invention, when a first image ratio image is reproduced on a terminal in a vertical state, the present invention can not only minimize the letter box or pillar, but also can reproduce an image having a high-quality second image ratio that includes and enlarges the main object of the image, but improves the low-quality problem that occurs while enlarging, so user visual satisfaction can be increased.

In addition, according to the present invention, when a first image ratio image (horizontal image) is reproduced on a terminal screen in a vertical state, since it can be reproduced using the terminal screen to the fullest, viewing immersion is increased, and since the entire terminal screen can be used to reproduce, visual satisfaction is high and the exposure effect is large, so when the reproduced image is an advertisement, the advertisement effect is great.

In addition, the present invention has an advantage of being applicable not only to video on demand (VOD) but also to real-time streaming because various image quality improvement techniques suitable for the receiving terminal side are applicable.

The effects of the present invention are not limited to those mentioned above, and other effects not mentioned will be clearly understood by those of ordinary skill in the art from the following description.

BRIEF DESCRIPTION OF THE DRAWINGS

FIG. 1 shows examples of a terminal with various screen ratios to which the conventional technology is applied to reproduce an image with a 16:9 image ratio.

FIG. 2 shows a block diagram of a system 10 according to an exemplary embodiment of the present invention.

DETAILED DESCRIPTION OF THE EMBODIMENTS

Figure 3:
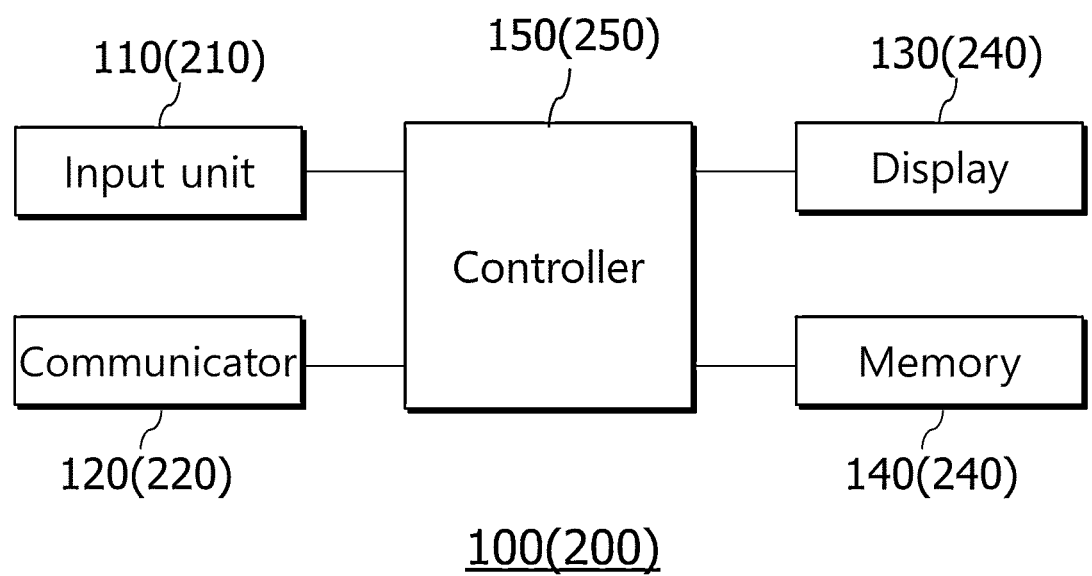
FIG. 3 shows a block diagram of a server 100 and a terminal 200 according to an exemplary embodiment of the present invention.

The above-mentioned objects, means, and effects thereof of the present invention will become more apparent from the following detailed description in relation to the accompanying drawings, and accordingly, those skilled in the art to which the present invention belongs will be able to easily practice the technical idea of the present invention. In addition, in describing the present invention, when it is determined that a detailed description of a related known technology may unnecessarily obscure the subject matter of the present invention, the detailed description will be omitted.

The terms used in this specification are for the purpose of describing embodiments only and are not intended to limit the present invention. In this specification, the singular forms "a,", "an," and "the" also include plural forms in some cases unless otherwise specified in the context. In this specification, terms such as "include", "comprise", "provide" or "have" do not exclude the presence or addition of one or more other elements other than elements mentioned.

In this specification, terms such as "or" and "at least one", and the like may represent one of the words listed together or a combination of two or more thereof. For example, "A or B" and "at least one of A and B" may include only one of A or B, or may also include both A and B.

In this specification, descriptions according to "for example", etc. may not exactly match the information presented, such as the recited properties, variables, or values, and effects such as modifications, including tolerances, measurement errors, limits of measurement accuracy, and other commonly known factors should not limit the modes for carrying out the invention according to the various exemplary embodiments of the present invention.

In this specification, when an element is described as being "connected" or "linked" to another element, it will be understood that it may be directly connected or linked to the other element, but intervening elements may also be present. On the other hand, when an element is referred to as being "directly connected" or "directly linked" to another element, it will be understood that there are no intervening elements present.

In this specification, when an element is described as being "on" or "adjacent to" another element, it will be understood that it may be directly "on" or "connected to" the other element, but intervening elements may also be present. On the other hand, when an element is described as being "directly on" or "directly adjacent to" another element, it will be understood that there are no intervening elements present. Other expressions describing the relationship between the elements, for example, "between" and "directly between", and the like can be construed similarly.

In this specification, terms such as "first" and "second" may be used to describe various elements, but, the above elements should not be limited by the terms above. In addition, the above terms should not be construed as limiting the order of each element, and may be used for the purpose of distinguishing one element from another. For example, a "first element" may be named as a "second element" and similarly, a "second element" may also be named as a "first element."

Unless otherwise defined, all terms used in this specification may be used with meanings commonly understood by those of ordinary skill in the art to which the present invention belongs. In addition, terms defined in a commonly used dictionary are not interpreted ideally or excessively unless explicitly and specifically defined.

Hereinafter, a preferred embodiment according to the present invention will be described in detail with reference to the accompanying drawings.

FIG. 2 shows a block diagram of a system 10 according to an exemplary embodiment of the present invention.

The system 10 according to an embodiment of the present invention is a system in which a server 100 provides a service for transmitting a bitstream including information on an image to at least one terminal 200 side through a network such as the Internet to reproduce the corresponding image on the terminal 200. At this time, the image may refer to a video. For example, the service provided by the system 10 may be a video on demand (VOD) or real-time streaming service or the like, but is not limited thereto.

In particular, the image included in the bitstream transmitted from the server 100 has content with an image ratio that is longer horizontally than vertically (hereinafter referred to as "first image ratio"). In addition, the terminal 200 performs various image processing on the image having the first image ratio received from the server 100 in the state of the screen ratio having longer vertically than horizontally (hereinafter referred to as the "vertical state") to reproduce the processed image in accordance with the vertical state. For example, the terminal 200 may reproduce an enlarged image in all pixels of the screen, but is not limited thereto.

In other words, the terminal 200 leaves the main content part for the image having the first image ratio received from the server 100 and cuts the rest, changes it to an image having an image ratio that is longer vertically than horizontally (hereinafter referred to as "second image ratio"), enlarges and converts the changed image having the second image ratio to match the screen size of the vertical state and reproduces the image. Of course, the server 100 transmits a bitstream further including additional information in addition to the image having the first image ratio, and accordingly, the terminal 200 may perform image processing, i.e., change and enlargement conversion, to the image having the second image ratio using the additional information.

The server 100 and the terminal 200 may be electronic devices capable of computing. For example, the electronic device may include a desktop PC (personal computer), a laptop PC (personal computer), a tablet personal computer, a netbook computer, a workstation, a personal digital assistant (PDA), a smartphone, a smart pad, or a mobile phone, but is not limited thereto.

In particular, the server 100 may separate (divide) the image having the first image ratio into a plurality of subunits and include information on this in the bitstream so that the AI model is applied for each unit. That is, the server 100 may separate the image having the first image ratio into a plurality of subunits, and then select an AI model applied for each subunit (hereinafter referred to as an "optimal AI model") according to the contents of the image within the corresponding subunit from among a plurality of AI models previously trained for each type of contents of the image.

For example, if it is separated into 100 subunits, information on 100 optimal AI models applied one by one for each of the 100 subunits may be included in the bitstream.

That is, the server 100 may generate a bitstream by encoding data including an image having the first image ratio, a reproduction area, and information on the optimal AI model, respectively. In this case, information on the reproduction area applied per frame of the image having the first image ratio may be included in the bitstream, and information on the optimal AI model applied per subunit (e.g., shot unit) equal to or greater than the frame (e.g., applied per key frame) may be included in the bitstream. Of course, the bitstream may include information on subunit for applying the optimal AI model.

However, the additional information included in the bitstream may be information on the reproduction area and the optimal AI model, and other information may be included.

Meanwhile, the server 100 may simply transmit a bitstream including an image having the first image ratio. In this case, the terminal 200 may generate the additional information described above, and may perform image processing, i.e., change and enlargement conversion, to the image having second image ratio using the additional information. This case corresponds to another embodiment of the present invention.

FIG. 3 shows a block diagram of a server 100 and a terminal 200 according to an exemplary embodiment of the present invention.

As shown in FIG. 3, the server 100 and the terminal 200 may include an input unit 110, 210, a communicator 120, 220, a display 130, 230, a memory 140, 240, and a controller 150, 250.

The input unit 110, 210 generates input data in response to various user inputs, and may include various input means.

For example, the input unit 110 may include a keyboard, a keypad, a dome switch, a touch panel, a touch key, a touchpad, a mouse, a menu button, and the like, but is not limited thereto.

The communicator 120 is a component that performs communication with other devices such as the terminal 200, and may transmit a bitstream or the like generated by the controller 150. Similarly, the communicator 220 is a component that communicates with other devices such as the server 100, and may receive a bitstream or the like generated by the server 100. In addition, the communicator 120, 220 may receive information on the pre-trained AI model from another device.

For example, the communicator 120, 220 may perform wireless communication such as 5th generation communication (5G), long term evolution-advanced (LTE-A), long term evolution (LTE), Bluetooth, Bluetooth low energy (BLE), near field communication (NFC), and Wi-Fi communication, or may perform wired communication such as cable communication, but is not limited thereto.

The display 130, 230 displays various image data on a screen, and may be configured as a non-emission panel or a light emitting panel. In addition, the display 230 may display an enlarged image of the converted image quality improvement.

For example, the display 130, 230 may include a liquid crystal display (LCD), a light emitting diode (LED) display, an organic light emitting diode (OLED) display, a micro electro mechanical systems (MEMS) display, or an electronic paper display, but is not limited thereto. In addition, the display 130, 230 may be combined with the input unit 120, 220 to be implemented as a touch screen, etc.

The memory 140, 240 stores various types of information necessary for the operation of the server 100 and the terminal 200. The storage information of the memory 140 may include, but is not limited to, an image having the first image ratio, a reproduction area, an AI model, an optimal AI model, and program information related to a method to be described later. In addition, the storage information of the memory 240 may include, but is not limited to, a bitstream, information separated from the bitstream (information on an image, a reproduction area, and an optimal AI model), and program information related to a method to be described later. In particular, a plurality of AI models may be stored and may be stored in compressed form, but are not limited thereto.

For example, the memory 140, 240 may include, but is not limited to, a hard disk type, a magnetic media type, a compact disc read only memory (CD-ROM), an optical media type, a magneto-optical media type, a multimedia card micro type, flash memory type, a ROM type (read only memory type), or a RAM type (random access memory type) and the like depending on the type. In addition, the memory 140, 240 may be a cache, a buffer, a main memory, an auxiliary memory, or a separately provided storage system depending on its purpose/location, but is not limited thereto.

The controller 150, 250 may perform various control operations of the server 100 and the terminal 200. That is, the controller 150, 250 may control the execution of a transmission and reception method to be described later, and may control the operations of the remaining components of the server 100 and the terminal 200, that is, the input unit 110, 210, the communicator 120, 220, the display 130, 230, the memory 140, 240 and the like. In addition, the controller 150, 250 may control an AI model to be received from another device and stored in the memory 140, 240. In addition, the controller 150 may control the AI model to be trained using training data stored in the memory 140 and stored in the memory 140.

For example, the controller 150, 250 may include, but is not limited to, a processor that is hardware or a process that is software executed by the corresponding processor, or the like.

Figure 4:
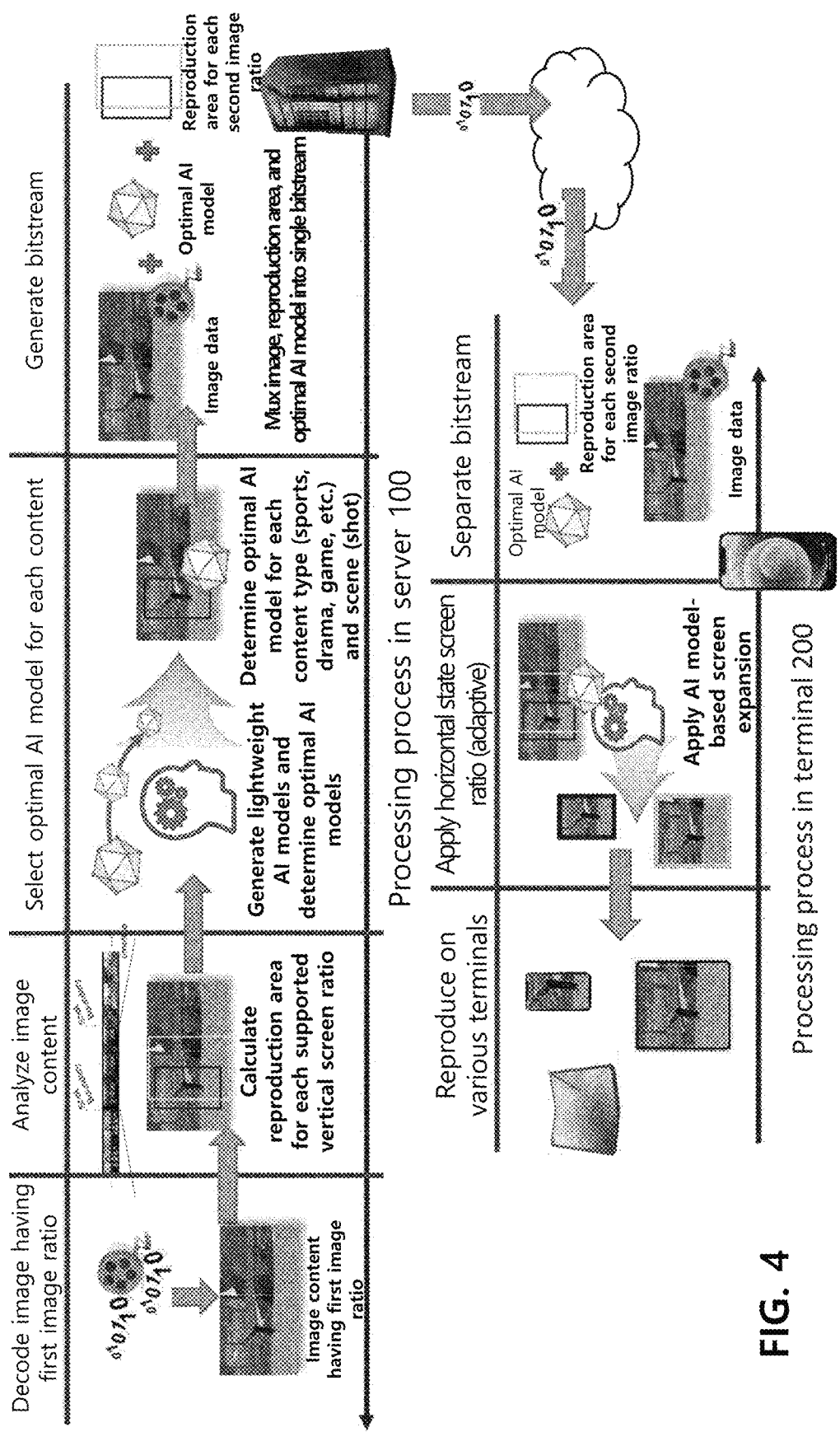
FIG. 4 shows a conceptual diagram of a transmission and reception method according to an exemplary embodiment of the present invention.

FIG. 4 shows a conceptual diagram of a transmission and reception method according to an exemplary embodiment of the present invention. Based on FIG. 4, the transmission and reception method according to an embodiment of the present invention will be described below.

Figure 5:
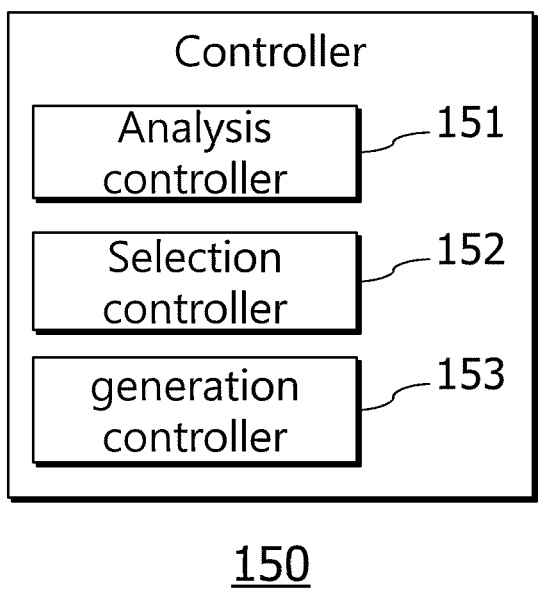
FIG. 5 shows a block diagram of a controller 150 of a server 100 according to an exemplary embodiment of the present invention.
Figure 6:
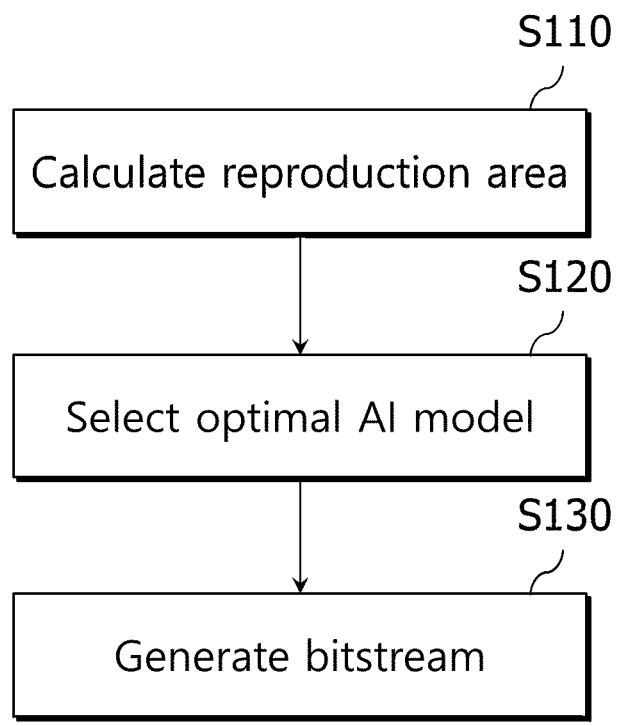
FIG. 6 shows a flowchart of a transmission method according to an exemplary embodiment of the present invention.

FIG. 5 shows a block diagram of a controller 150 of a server 100 according to an exemplary embodiment of the present invention, and FIG. 6 shows a flowchart of a transmission method according to an exemplary embodiment of the present invention.

As shown in FIG. 5, the controller 150 for performing the transmission method according to an embodiment of the present invention may include an Analysis controller 151, a Selection controller 152, and a generation controller 153. For example, the Analysis controller 151, the Selection controller 152, and the generation controller 153 may be a hardware component of the controller 150 or a process that is software performed by the controller 150, but are not limited thereto.

Referring to FIG. 6, the transmission method according to an embodiment of the present invention may include steps S110 to S130. Of course, the order of steps S110 and S120 may be changed or performed in parallel at the same time.

First, the Analysis controller 151 analyzes the contents of the corresponding frame image for each frame of the image having the first image ratio to calculate a reproduction area corresponding to a part of the corresponding frame image in step S110. In other words, when the image having the first image ratio is compressed, the Analysis controller 151 may first decode this image and then perform image content analysis on the decoded image having the first image ratio to calculate the reproduction area.

In this case, the reproduction area is calculated for each frame with respect to the image having the first image ratio included in the bitstream, and is a part area of the corresponding frame image and is an area corresponding to the main content of the corresponding frame image. For example, when the terminal 200 cuts out a part of the image having the first image ratio and changes it to an image having the second image ratio for reproduction in the vertical state, the corresponding reproduction area is main content in the image having the first image ratio, so it is not cut and only the remaining part is cut. That is, the reproduction area may be referred to as an area that should be included in the image having the second image ratio when the image having the first image ratio is changed to the image having the second image ratio in the terminal 200.

For example, if an image having the first image ratio has 1000 frames, information on 1000 reproduction areas applied one by one to each of 1000 frames may be included in the bitstream.

Figure 7:
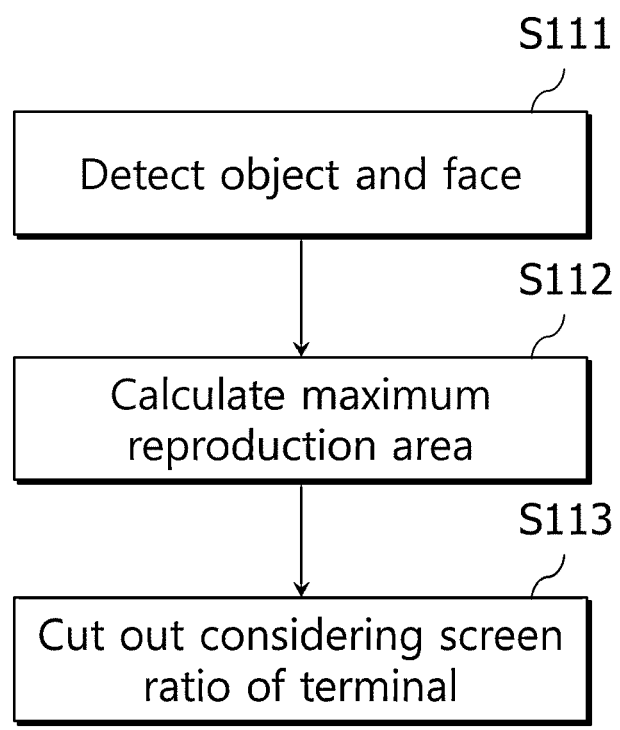
FIG. 7 shows a more detailed flowchart of step S110 of a transmission method according to an exemplary embodiment of the present invention.

FIG. 7 shows a more detailed flowchart of step S110 of a transmission method according to an exemplary embodiment of the present invention.

Specifically, referring to FIG. 7, the Analysis controller 151 detects areas for an object and a face in each frame image of the decoded image having the first image ratio, respectively, in step S111. In this case, the Analysis controller 151 may detect an area for an object and an area for a face in each frame image using an object detector and a face detector. That is, the object detector may detect the main object, and the face detector may detect the face of the main character. In this case, each detector detects each area by applying various algorithms related to object detection, and may be stored in the memory 140.

For example, each detector may be a detector using, but is not limited to, Canny Edge, Harris corner, Haar-like features, HOG (Histogram of Oriented Gradient), Scale Invariant Feature Transform (SIFT), or machine learning models or the like.

Thereafter, the Analysis controller 151 calculates an area including each of the detected areas (hereinafter, referred to as "maximum reproduction area") in step S112. That is, since each area detected in step S111 corresponds to a candidate area that may be a reproduction area, a maximum reproduction area including all of them is calculated. For example, when there are a plurality of areas detected in step S111, each of the detected areas may be included in the maximum reproduction area.

In particular, by using an object detector and a face detector together instead of one detector in step S111 and calculating the maximum reproduction area to include all detection areas in step S112, the present invention can further increase the accuracy of image content analysis for each frame image.

Thereafter, the Analysis controller 151 calculates at least one reproduction area having a second image ratio from each frame through a cutting process for the calculated maximum reproduction area in step S113. In other words, it performs a cutting process for the maximum reproduction area to match the screen ratio, taking into account the type of vertical state screen ratio (1:1, 4:5, 9:16, 10:21, etc.) that the terminal 200 may have. Of course, the vertical state screen ratio that the terminal 200 may have, may be a screen ratio having the same vertical and horizontal in addition to a screen ratio having longer vertical than horizontal.

For example, the cutting process may be performed to cut from other areas around a certain area of the maximum reproduction area (for example, around an area for a specific type of object or face), but is not limited thereto.

In particular, in step S113, a plurality of reproduction areas may be calculated in addition to one per frame. That is, since the types of vertical state screen ratios that the terminal 200 may have may vary, a plurality of reproduction areas having different ratios of second image ratios for one frame may be calculated so as to reflect these various screen ratios as much as possible. For example, at least one of the 1:1 image ratio reproduction area, the 4:5 image ratio reproduction area, the 9:16 image ratio reproduction area, and the 10:21 image ratio reproduction area may be calculated for each frame, but is not limited thereto.

However, when a plurality of reproduction areas having different ratios are calculated for each frame, there is an advantage that the reproduction area may be more adaptively applied to the terminal 200 having various screen ratios.

Meanwhile, the Selection controller 152 selects an optimal AI (artificial intelligence) model applied for each sub-unit of the image having the decoded first image ratio in step S120. That is, the Selection controller 152 may separate the decoded image having the first image ratio into a plurality of subunits, and select an optimal AI model applied for each subunit according to the contents of the image within the corresponding subunit from among a plurality of AI models previously trained for each type of contents of the image and stored in the memory 140.

In this case, the Selection controller 152 may separate the decoded image having the first image ratio into a plurality of subunits using various scene change detection algorithms. For example, the Selection controller 152 may classify each subunit by calculating a difference value between adjacent frames and determining that a shot change has been made if the calculated difference value is greater than a certain reference value.

Of course, the number of frames included in each separated subunit may not be constant. That is, the number of frames of the first subunit and the number of frames of the second subunit may be the same or different. For example, subunits may be divided according to shots, scenes, or sequences, but are not limited thereto. However, the subunit may be the same as the frame or a unit larger than the frame, but it may be preferable that it be a unit larger than the frame. That is, each subunit may include a plurality of frames.

Meanwhile, the AI model is a model applied when enlarging and converting a changed image having the second image ratio to fit the screen size of the terminal 200. If the conventional technology is applied, the changed image having the second image ratio is simply enlarged and converted to a certain ratio, so the image quality is degraded like low resolution, so the user's visual satisfaction is bound to be lowered. To solve this problem, in the present invention, by using an AI model, the image having the second image ratio can be enlarged and converted while the image quality can also be improved. That is, the AI model is a machine learning model trained according to machine learning techniques, and is a model trained to generate enlarged images with improved image quality from low-quality images.

Specifically, the AI model is a machine learning model trained according to the machine learning technique of supervised learning through training data of input data and output data pairs (datasets). That is, the AI model can be trained using training data including input data of low-quality images and output data of enlarged images with improved image quality. Accordingly, the AI model has a function of the relationship between the low-quality images, which are input data, and the enlarged images with improved image quality, which are output data, and expresses this using various parameters.

For example, the AI model may express the relationship between low-quality images and enlarged images with improved image quality using parameters of weights and biases. Accordingly, when input data of a low-quality image (e.g., a changed image having the second image ratio) is input to the trained AI model, output data of an enlarged image with image quality improvement (e.g., an image that is enlarged by the screen size of the terminal 200 and converted to have a high-quality second image ratio) according to the function may be output.

In this case, the image quality improvement type may be at least one of resolution increase, noise removal, and dynamic range increase compared to the low-quality image. That is, when a low-quality image is input, the AI model may output an image with image quality improvement of any one of resolution increase, noise removal, and dynamic range increase. However, since the image having the second image ratio must be enlarged and converted, it may be preferable to necessarily include resolution increase. For example, when a low-quality image is input, the AI model may output an image quality improvement image with an increase in resolution, an image quality improvement image with resolution increase and noise removal, or an image quality improvement image with resolution increase and dynamic range increase.

Meanwhile, a plurality of AI models may be stored in the server 100 or other devices to which the server 100 is connected. In this case, each AI model may be a model trained according to the type of content contained in an image having the first image ratio. For example, the type of content in the image may be sports, drama, game, news, education, entertainment, etc., but is not limited thereto.

That is, each AI model may be trained based on images having different types of content. By providing a plurality of AI models that are variously applied according to the type of image content as described above, there is an advantage in that the efficiency of improving the image quality may be further improved when the changed image having the second image ratio is enlarged and converted.

For example, the Selection controller 152 may separate the decoded image having the first image ratio into shot units, receive information on consecutive frame images included in the separated shots, and select an optimal AI model for each shot.

Figure 8:
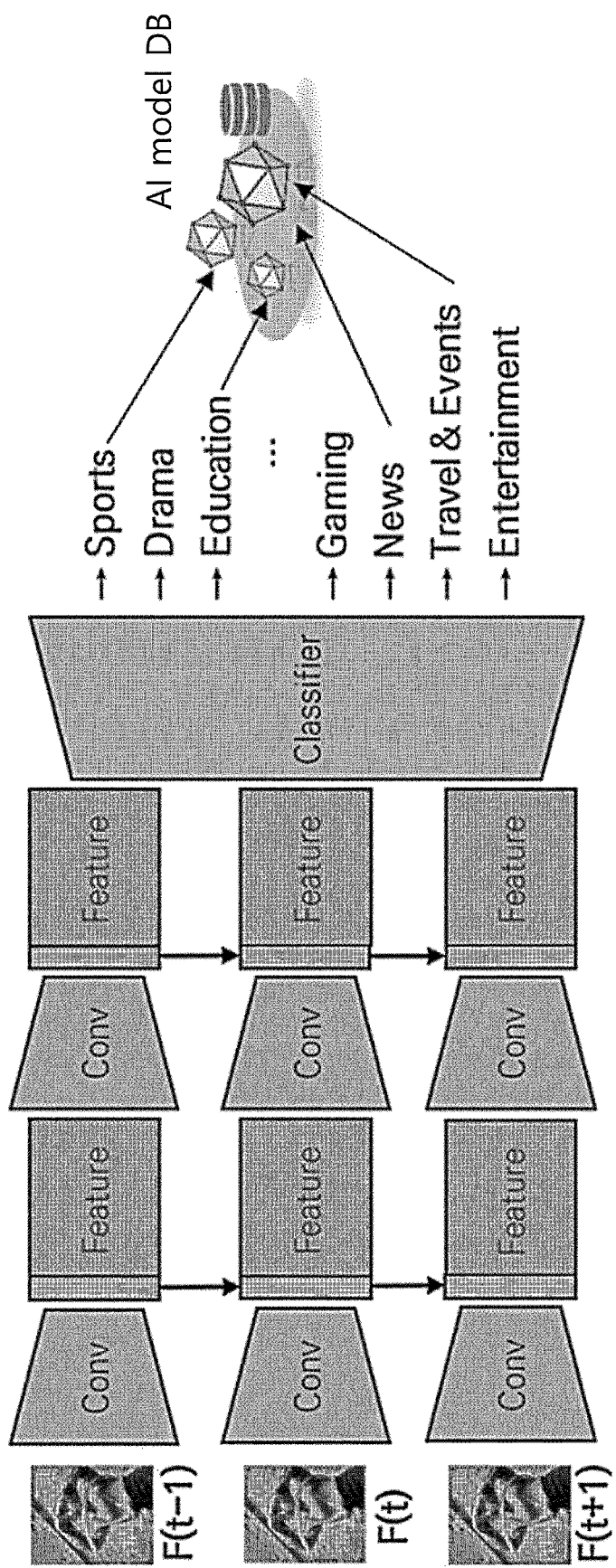
FIG. 8 shows an example of selecting an optimal AI model in step S120.

FIG. 8 shows an example of selecting an optimal AI model in step S120.

Referring to FIG. 8, the Selection controller 152 may select an optimal AI model using a classifier. That is, the classifier is a machine learning model trained according to the machine learning technique of supervised learning through training data of input data and output data pairs (datasets).

In this case, the classifier may be trained using training data including input data of consecutive frame images and output data for the types of content (e.g., sports, drama, game, news, education, entertainment, etc.) of these frame images. Accordingly, the classifier has a function of the relationship between the continuous frame image, which is input data, and the content type, which is output data, and expresses this using various parameters.

For example, the classifier may express the relationship between continuous frame images and the content types of these frame images using parameters of weights and biases. Accordingly, as shown in FIG. 7, when input data of consecutive frame images ($F(t-1)$, $F(t)$, and $F(t+1)$) within a certain subunit is input to the trained classifier, output data for the content types of the images ($F(t-1)$, $F(t)$, and $F(t+1)$) of the corresponding subunit according to the function may be output.

For example, machine learning techniques applied to AI models and classifiers may include, but are not limited to, Artificial neural network, Boosting, Bayesian statistics, Decision tree, Gaussian process regression, Nearest neighbor algorithm, Support vector machine, Random forests, Symbolic machine learning, Ensembles of classifiers, or Deep learning.

In particular, when AI models and classifiers are deep learning models trained by deep learning techniques, the relationship between input data and output data is expressed as multiple layers, and these multiple representation layers are sometimes referred to as "neural networks." Such deep learning models can have encouraging performance in image processing fields such as the present invention.

For example, deep learning techniques may include Deep Neural Network (DNN), Convolutional Neural Network (CNN), Recurrent Neural Network (RNN), Restricted Boltzmann Machine (RBM), Deep Belief Network (DBN), Deep Q-Networks, and the like, but are not limited thereto.

In particular, if wanting to create a new AI model for images within a subunit (e.g., a shot, etc.), the learning process takes a long time, and so is not suitable for real-time transmission. Accordingly, in the present invention, a plurality of AI models (i.e., AI model DB) trained in advance according to the types of content of the image are pre-stored in the memory 140 or a separate database device, and the Selection controller 152 searches the AI model DB for an optimal AI model suitable for the current subunit and uses it. That is, the Selection controller 152 may search the pre-stored AI model DB for an AI model matching the type of content output by the classifier for an input of a continuous frame image of a certain subunit and select the searched AI model as an optimal AI model applied to the corresponding subunit. As a result, the present invention has an advantage of being more consistent with real-time transmission of an image.

In addition, since the AI model is trained according to the type of content of the image, it may be more effective to divide it into shot units or scene units, which are units for a series of scenes of the same content type.

Thereafter, the generation controller 153 generates a bitstream including an image having the first image ratio, a reproduction area calculated in step S110, and information on the optimal AI model selected in step S120 using a multiplexer to transmit it to the terminal 200 (S130). The bitstream generated as described above is transmitted to the terminal 200 through the communicator 120.

For example, the generation controller 153 may compress and process the image having the first image ratio and include information on the corresponding encoding code in the bitstream. In this case, the generation controller 153 may generate the corresponding encoding code using various image compression techniques. The image compression technique may be a technique using motion compensation, a quarter pixel, or a deblocking filter, or may be a technique used in streaming or video on demand (VOD) or the like. For example, the image compression technique may be MPEG series (MPEG-1, MPEG-2, MPEG-3, MPEG-4, MPEG-7, etc.), H.2xx series (H.261, H.263, H.264, H.265, etc.), but is not limited thereto.

Of course, the generation controller 153 may also include information on audio matching the image having the first image ratio in the bitstream. In this case, the generation controller 153 may generate the corresponding encoding code using various audio compression techniques.

In particular, reproduction area information should be included in the bitstream so that it can be applied to each frame, and multiple reproduction areas that can be applied to one frame should be included in the bitstream to support various screen ratios of the terminal 200. In addition, since the AI model varies depending on the content type and subunit, it should be included in the bitstream to support the minimum key frame interval. For example, when the separated subunit is a shot unit, information on the optimal AI model may be included in the bitstream so that the optimal AI model is selected and applied for each key frame.

For example, information on the reproduction area and optimal AI model may be additionally included in SEI (Supplemental enhancement information) in a Network Abstraction Layer (NAL) bitstream of an image having the first image ratio, but it is not limited thereto. However, including the corresponding additional information in the SEI message may be a practical method applicable to the current commercial technology.

That is, the SEI message is an area in the bitstream that informs the properties of image data or can contain user data, and the decoder on the terminal 200 does not necessarily support decoding of the corresponding area. However, in the case of a decoder that supports the SEI message, the characteristics of the received image can be improved by utilizing the SEI message.

Meanwhile, the information on the optimal AI model included in the bitstream may be actual data on the optimal AI model or index data on the optimal AI model. That is, in the case of actual data on the optimal AI model, the terminal 200 may separate it from the bitstream and use it. In this case, the generation controller 153 may compress and process the actual data on the optimal AI model in various ways according to the MPEG-NNR (Neural Network Representation) standard, etc. and include information on the corresponding encoding code in the bitstream.

On the other hand, in the case of index data for the optimal AI model, the terminal 200 may separate it from the bitstream and select and use the matched data among actual data for a plurality of AI models pre-stored in the terminal 200 based on the separated index data.

Figure 9:
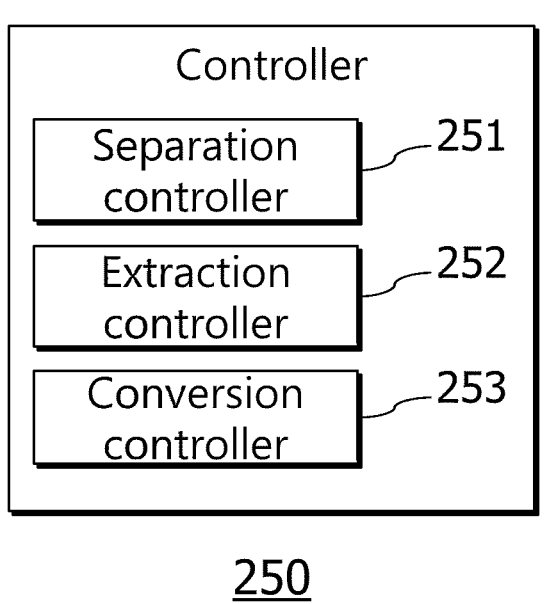
FIG. 9 shows a block diagram of a controller 250 of a terminal 100 according to an exemplary embodiment of the present invention.
Figure 10:
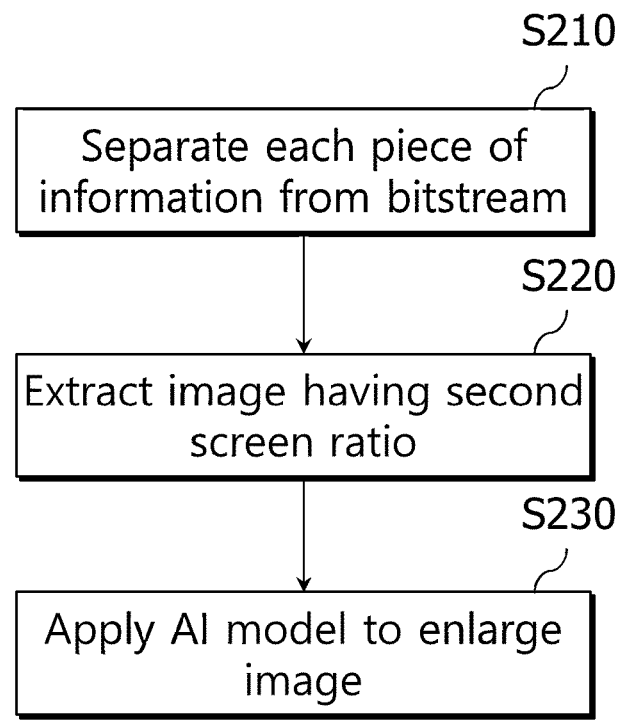
FIG. 10 shows a flowchart of a reception method according to an exemplary embodiment of the present invention.

FIG. 9 shows a block diagram of a controller 250 of a terminal 100 according to an exemplary embodiment of the present invention, and FIG. 10 shows a flowchart of a reception method according to an exemplary embodiment of the present invention.

As shown in FIG. 9, the controller 250 for performing the reception method according to an embodiment of the present invention may include a Separation controller 251, an Extraction controller 252, and a Conversion controller 253. For example, the Separation controller 251, the Extraction controller 252, and the Conversion controller 253 may be a hardware component of the controller 250 or a process that is software performed by the controller 250, but are not limited thereto.

Referring to FIG. 10, the reception method according to an embodiment of the present invention may include steps S210 to S230.

First, the Separation controller 251 separates information on an image having the first image ratio, a reproduction area, and an optimal AI model, respectively, from the bitstream of the server 100 received through the communicator 220 using a de-multiplexer in step S210. Of course, the Separation controller 251 may also separate information on audio included in the bitstream. For example, when each information of the bitstream is compressed, the Separation controller 251 may derive each information using each decoder for decompressing them.

Thereafter, the Extraction controller 252 extracts an image having the second image ratio for each frame from the information on the image having the first image ratio separated in step S210 by using the information on the reproduction area separated in step S210 (S220). That is, an image having the second image ratio of the frame may be extracted by leaving a portion corresponding to the reproduction area of the frame from each frame image having the first image ratio and removing the rest.

In particular, in step S210, when information on multiple reproduction areas of different ratios applied to one frame is in the bitstream, the Separation controller 251 may separate information on the multiple reproduction areas, respectively. In this case, in step S220, the Extraction controller 252 may select information on a reproduction area (hereinafter referred to as a "similar reproduction area") that is most similar to the screen ratio of the display 240 of the terminal 200 from among the information on each of the plurality of separated reproduction areas.

For example, information on each of the 1:1 image ratio reproduction area, the 4:5 image ratio reproduction area, the 9:16 image ratio reproduction area, and the 10:21 image ratio reproduction area is included in the bitstream, respectively, and the display 240 of the terminal 200 may have a vertical state screen ratio of 10:16. In this case, the Extraction controller 252 may adaptively select information on the 9:16 image ratio reproduction area that is most similar to the screen ratio of the 10:16 vertical state as information on the similar reproduction area.

In this way, the Extraction controller 252 may select a similar reproduction area for each frame. That is, the Extraction controller 252 may extract an image having the second image ratio of the frame by leaving a portion corresponding to the similar reproduction area of the frame from each frame image having the first image ratio and removing the rest.

Thereafter, the Conversion controller 253 applies the AI model according to the optimal AI model information separated in step S210 for each subunit, and enlarges and converts the image having the second image ratio extracted in step S220 (S230). That is, the Conversion controller 253 inputs the image having the second image ratio, which is the low-quality image separated in S210, into the AI model. As a result, the AI model may output an enlarged image with improved image quality according to the embedded function, that is, an image that is enlarged by the size of the display 240 of the terminal 200 and converted to have a high-quality second image ratio.

Of course, if necessary, the Conversion controller 253 may perform image processing in a process of cutting a part of the image having the high-quality second image ratio enlarged and converted while outputting from the AI model or perform size interpolation according to a resolution transformation technique. This may be performed when the enlarged and converted high-quality second image ratio image is larger than the display 240 of the terminal 200. For example, the resolution transformation technique may be Bilinear, bicubic interpolation, down-sampling, etc., but is not limited thereto.

Figure 11:
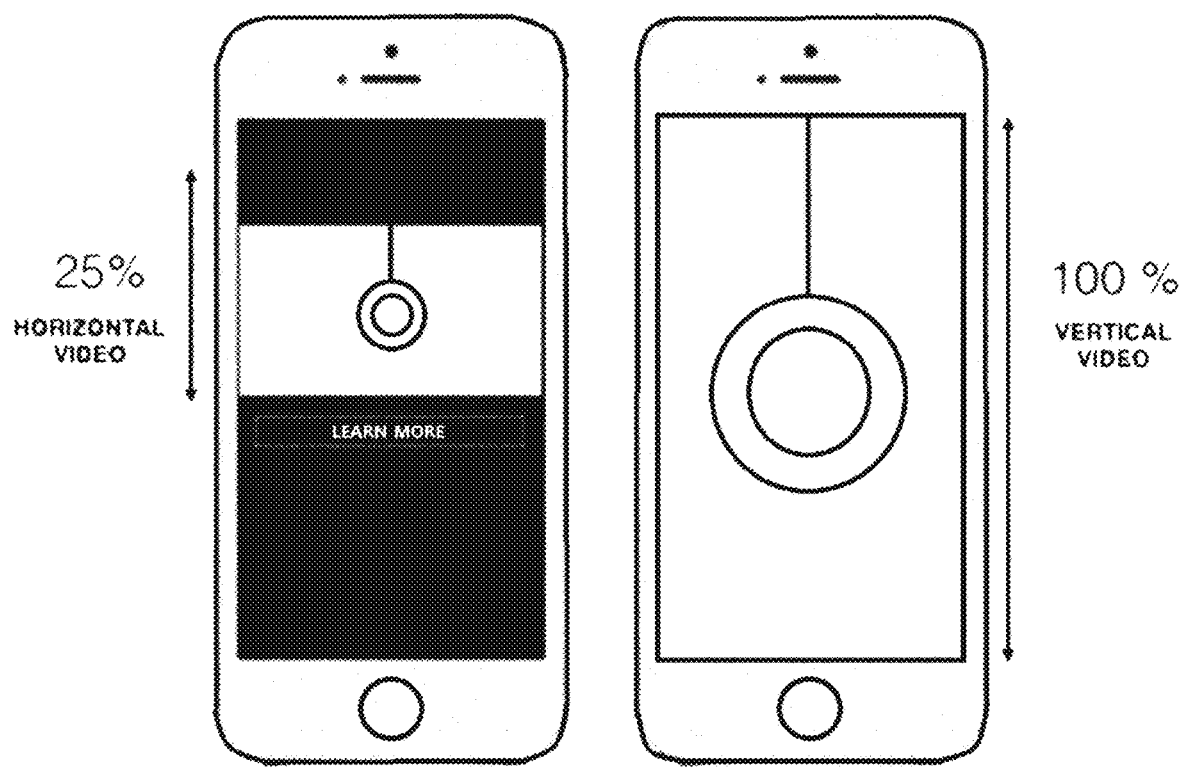
FIG. 11 shows a comparison example of reproducing an image having a first image ratio in a terminal in a vertical state.

FIG. 11 shows a comparison example of reproducing an image having a first image ratio in a terminal in a vertical state. That is, the left side is an image reproduced according to the conventional technology, and the right side is an image reproduced according to the present invention.

Thereafter, the controller 250 may control the high-quality second image ratio image enlarged and converted in step S230 to be reproduced on the display unit 240 of the terminal 200. In this case, the enlarged and converted high-quality second image ratio image may be reproduced in all pixels of the display unit 240 of the terminal 200, as shown in FIG. 11, but is not limited thereto.

Of course, the controller 250 may also synchronize audio for the corresponding image and control it to be output from the terminal 200 when reproducing the enlarged and converted second image ratio image.

Referring to FIG. 11, when a first image ratio image is reproduced on a terminal in a vertical state, unlike the conventional technology, the present invention can not only minimize the letter box or pillar, but also can reproduce an image having a high-quality second image ratio that includes and enlarges the main object of the image, but improves the low-quality problem that occurs while enlarging. As a result, the present invention has an advantage of increasing the user's visual satisfaction.

In other words, while conventional technology (left side of FIG. 11) accounts for 25% of the terminal screen, in the case of the present invention (right side of FIG. 11), since the entire terminal screen can be used, there is an advantage in that visual satisfaction is high and the exposure effect is large, so when the reproduced image is an advertisement, the advertisement effect is great.

Figure 12:
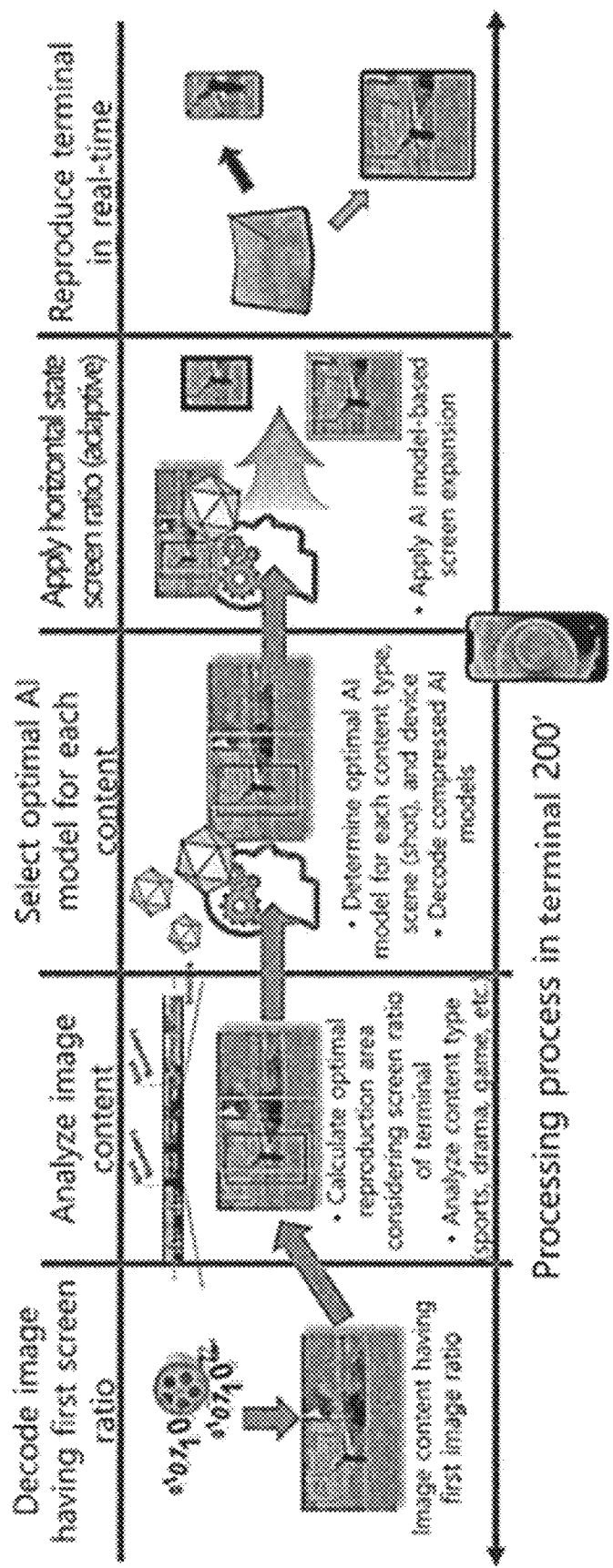
FIG. 12 shows a conceptual diagram of a transmission and reception method according to another exemplary embodiment of the present invention.

FIG. 12 shows a conceptual diagram of a transmission and reception method according to another exemplary embodiment of the present invention. Based on FIG. 12, the transmission and reception method according to another embodiment of the present invention will be described below.

In the transmission and reception method according to another embodiment of the present invention, the controller 150 of the server 100 generates a bitstream simply including information on an image having the first image ratio, unlike the above-described embodiment. That is, the controller 150 of the server 100 does not calculate information on the reproduction area and optimal AI model or the like, and this additional information is calculated on the terminal 200 side. Of course, the controller 150 of the server 100 may also include information on audio matching the image having the first image ratio in the bitstream. However, since the contents of the image and audio having the first image ratio are the same as the main contents described above in the transmission and reception method according to an embodiment of the present invention, the description will be omitted below.

Figure 13:
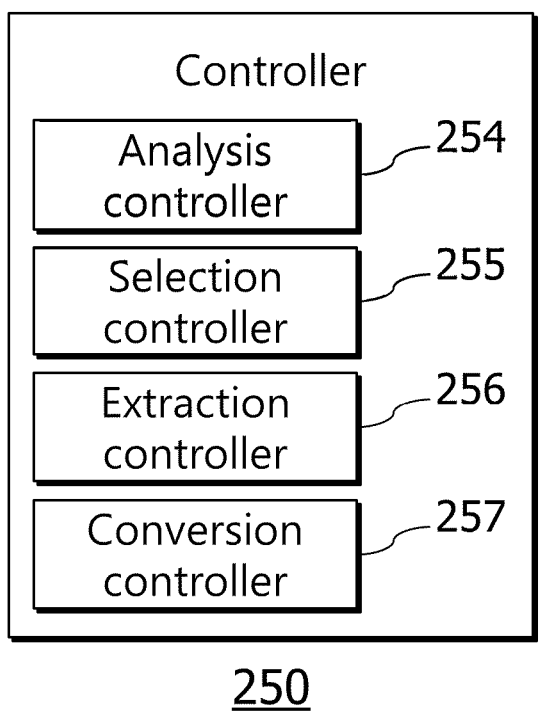
FIG. 13 shows a block diagram of a controller 250 of a terminal 200 according to another exemplary embodiment of the present invention.
Figure 14:
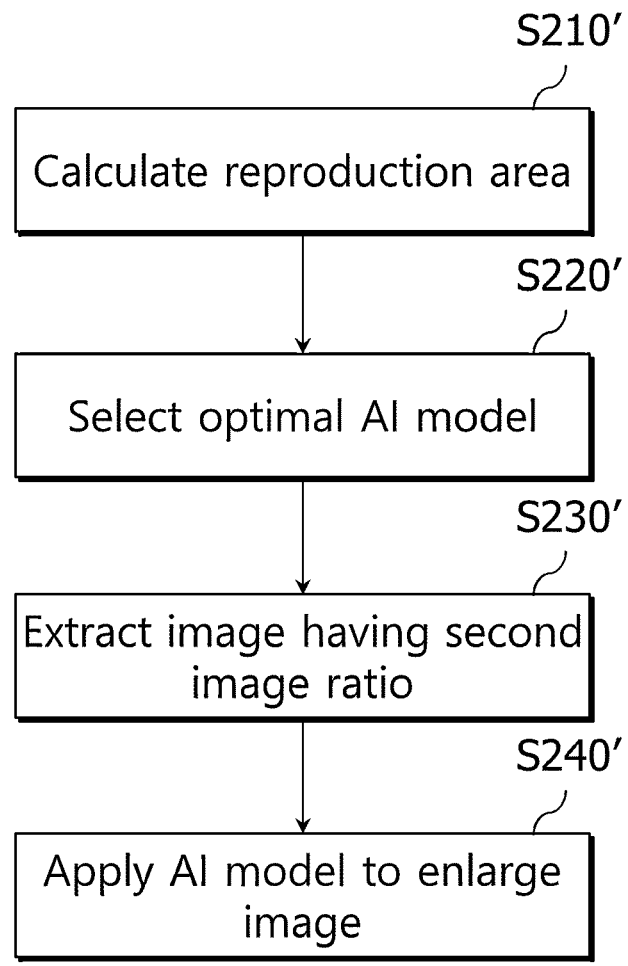
FIG. 14 shows a flowchart of a reception method according to another exemplary embodiment of the present invention.

FIG. 13 shows a block diagram of a controller 250 of a terminal 200 according to another exemplary embodiment of the present invention, and FIG. 14 shows a flowchart of a reception method according to another exemplary embodiment of the present invention.

As shown in FIG. 13, the controller 250 for performing the transmission method according to another embodiment of the present invention may include an Analysis controller 254, a Selection controller 255, an Extraction controller 256, and a Conversion controller 257. For example, the Analysis controller 254, the Selection controller 255, the Extraction controller 256, and the Conversion controller 257 may be a hardware component of the Conversion controller 250 or a process that is software performed by the controller 250, but are not limited thereto.

Referring to FIG. 6, the reception method according to another embodiment of the present invention may include steps S210' to S240'. Of course, the order of steps S210' and S220' may be changed or performed in parallel at the same time.

First, the Analysis controller 254 analyzes the contents of the corresponding frame image for each frame of the image having the first image ratio to calculate a reproduction area corresponding to a part of the corresponding frame image in step S210'. However, the Analysis controller 254 and step S210' are the same as the main contents described above in addition to the fact that the Analysis controller 151 and step S110 are applied to the terminal 200 in the transmission and reception method according to an embodiment of the present invention, so the description thereof will be omitted below.

In addition, the Selection controller 255 separates the image having the first image ratio into a plurality of subunits, and selects an optimal AI model applied for each subunit according to the contents of the image within the corresponding subunit from among a plurality of AI models previously trained for each type of contents of the image and pre-stored in the memory 140 in step S220'. However, the Selection controller 255 and step S220' are the same as the main contents described above in addition to the fact that the Selection controller 152 and step S120 are applied to the terminal 200 in the transmission and reception method according to an embodiment of the present invention, so the description thereof will be omitted below.

Thereafter, the Extraction controller 256 extracts an image having the second image ratio from the image having the first image ratio for each frame based on the reproduction area calculated in S210' (S230'). However, the Extraction controller 256 and step S230' are the same as the main contents described above for the Extraction controller 252 and step S220 in the transmission and reception method according to an embodiment of the present invention, so the description thereof will be omitted below.

Thereafter, the Conversion controller 257 applies the optimal AI model selected in step S220' for each subunit to enlarge and convert the image having the second image ratio extracted in step S230' (S240'). However, the Conversion controller 257 and step S240' are the same as the main contents described above for the Conversion controller 253 and step S230 in the transmission and reception method according to an embodiment of the present invention, so the description thereof will be omitted below.

Thereafter, the controller 250 may control the high-quality second image ratio image enlarged and converted in step S240' to be reproduced on the display unit 240 of the terminal 200. In this case, the enlarged and converted high-quality second image ratio image may be reproduced in all pixels of the display unit 240 of the terminal 200, as shown in FIG. 11, but is not limited thereto.

Of course, the controller 250 may also synchronize audio for the corresponding image and control it to be output from the terminal 200 when reproducing the enlarged and converted second image ratio image.

That is, in the case of another embodiment of the present invention, while performing a part of the server 100 in the terminal 200, one reproduction area is calculated rather than several in consideration of the screen ratio of the terminal 200 in step S210', and a multiplexer and demultiplexer for transmitting and receiving a bitstream including an optimal AI model are not required. In addition, since the terminal 200 analyzes the content and selects the optimal AI model, reproduction area extraction and AI model selection may be performed at a somewhat low quality, but there is an advantage that there is no conversion of the bitstream for this additional information.

The present invention configured as described above has the following differences compared to the conventional technology. That is, the present invention performs processing and transformation on the image screen, such as cutting or enlarging the reproduction screen so that the entire resolution of the terminal can be used when reproducing the image. To this end, the present invention performs content analysis, selection of the optimal AI model for each content, and adaptive screen ratio conversion.

Accordingly, according to the present invention, when a first image ratio image (horizontal image) is reproduced on a terminal screen in a vertical state, information in unnecessary areas of the image can be removed and only the portion corresponding to the main area of interest can be enlarged, and in some cases, new screen ratio conversion technology can be provided that allows reproduction to be enlarged to full screen. In particular, according to the present invention, when a first image ratio image is reproduced on a terminal in a vertical state, the present invention can not only minimize the letter box or pillar, but also can reproduce an image having a high-quality second image ratio that includes and enlarges the main object of the image, but improves the low-quality problem that occurs while enlarging, so user visual satisfaction can be increased. In addition, according to the present invention, when a first image ratio image (horizontal image) is reproduced on a terminal screen in a vertical state, since it can be reproduced using the terminal screen to the fullest, viewing immersion is increased, and since the entire terminal screen can be used to reproduce, visual satisfaction is high and the exposure effect is large, so when the reproduced image is an advertisement, the advertisement effect is great. In addition, the present invention has an advantage of being applicable not only to video on demand (VOD) but also to real-time streaming because various image quality improvement techniques suitable for the receiving terminal side are applicable.

In the detailed description of the present invention, although specific embodiments have been described, it is apparent that various modifications are possible without departing from the scope of the present invention. Therefore, the scope of the present invention is not limited to the described embodiments, and should be defined by the following claims and their equivalents. In particular, the present invention can also be applied to intelligent vertical-horizontal image conversion technology that adaptively transforms the resolution of an image when reproducing an image having a vertically long image ratio on a terminal in a horizontally long screen ratio state. In this case, in the above description, the terminal's "vertically long screen ratio state" can be replaced with a "horizontally long screen ratio state," and the "image having a horizontally long image ratio" can be replaced with an "image having a vertically long image ratio."

INDUSTRIAL APPLICABILITY

The present invention can provide an electronic device, a system, and a method for intelligent horizontal-vertical image conversion technology that adaptively transforms the resolution of an image when reproducing an image having a horizontally long image ratio on a terminal in a long screen ratio state.

What is claimed is:

1. An electronic device for transmitting a bitstream containing information on an image having a first image ratio that is longer horizontally than vertically to a terminal to enlarge and reproduce the image when the terminal has a screen ratio that is longer vertically than horizontally, the electronic device comprising:
    an analysis controller configured to analyze contents of a corresponding frame image for each frame of the image to calculate a reproduction area corresponding to a part of the corresponding frame image;
    a selection controller configured to separate the image into a plurality of subunits, and select an optimal artificial intelligence (AI) model applied for each subunit according to the contents of the image within the corresponding subunit from among a plurality of AI models previously trained for each type of contents of the image; and
    a generation controller configured to generate the bitstream including information on the image, the reproduction area, and the optimal AI model, respectively.

2. The electronic device of claim 1, wherein the terminal is configured to i) receive the bitstream, ii) separate information on an image, a reproduction area, and an optimal AI model from the received bitstream, respectively, iii) extract an image having a second image ratio that is longer vertically than horizontally for each frame from the separated image information based on the separated reproduction area information, and iv) apply the AI model according to the separated optimal AI model information for each subunit to enlarge and reproduce the extracted image having the second image ratio.

3. The electronic device of claim 2, wherein the terminal is configured to reproduce the enlarged image in all pixels of a screen.

4. The electronic device of claim 1, wherein the analysis controller is configured to detect areas for an object and a face in each frame image, respectively, calculate a maximum reproduction area including the detected area, and calculate at least one reproduction area having a second image ratio longer vertically than horizontally through a cutting process for the calculated maximum reproduction area.

5. The electronic device of claim 4, wherein the maximum reproduction area comprises an area including all of the detected areas when there is a plurality of the detected areas.

6. The electronic device of claim 4, wherein the analysis controller is configured to calculate a plurality of the reproduction areas, and wherein each reproduction area has a different ratio of the second image ratio.

7. The electronic device of claim 6, wherein the terminal is configured to i) receive the bitstream, ii) separate information on the image, the reproduction area, and the optimal AI model from the received bitstream, respectively, iii) extract the image having the second image ratio for each frame from the separated image information based on the reproduction area information that is most similar to the screen ratio of the terminal among the plurality of separated reproduction area information, and iv) apply the AI model according to the separated optimal AI model information for each subunit to enlarge and reproduce the extracted image having the second image ratio.

8. The electronic device of claim 1, wherein each of the AI models comprises a model trained to generate an enlarged image with improved image quality from low-quality images of different contents according to a machine learning technique.

9. The electronic device of claim 8, wherein the optimal AI model is configured to perform image quality improvement of at least one of resolution increase, noise removal, or dynamic range increase.

10. The electronic device of claim 1, wherein the generation controller is configured to generate the bitstream to include information on the reproduction area and the AI model in supplemental enhancement information (SEI) of a network abstraction layer (NAL).

11. The electronic device of claim 1, wherein the information on the optimal AI model included in the bitstream comprises actual data on the optimal AI model or index data on the optimal AI model.

12. A system comprising:
a server configured to transmit a bitstream containing information on an image having a first image ratio longer horizontally than vertically; and
a terminal configured to enlarge and reproduce the image in a screen ratio longer vertically than horizontally,
wherein the server comprises:
an analysis controller configured to analyze contents of a corresponding frame image for each frame of the image to calculate a reproduction area corresponding to a part of the corresponding frame image;
a selection controller configured to separate the image into a plurality of subunits, and select an optimal artificial intelligence (AI) model applied for each subunit according to the contents of the image within the corresponding subunit from among a plurality of AI models previously trained for each type of contents of the image; and
a generation controller configured to generate the bitstream including information on the image, the reproduction area, and the optimal AI model, respectively, and
wherein the terminal is further configured to:
receive the bitstream,
separate information on an image, a reproduction area, and an optimal AI model from the received bitstream, respectively,
extract an image having a second image ratio that is longer vertically than horizontally for each frame from the separated image information based on the separated reproduction area information, and
apply the AI model according to the separated optimal AI model for each subunit to enlarge and reproduce the extracted image having the second image ratio.

13. An electronic device for enlarging and reproducing an image having a first image ratio that is longer horizontally than vertically in a screen ratio that is longer vertically than horizontally, the electronic device comprising:
an analysis controller configured to analyze contents of a corresponding frame image for each frame of the image to calculate a reproduction area corresponding to a part of the corresponding frame image;
a selection controller configured to separate the image into a plurality of subunits, and select an optimal artificial intelligence (AI) model applied for each subunit according to the contents of the image within the corresponding subunit from among a plurality of AI models previously trained for each type of contents of the image;
an extraction controller configured to extract, from the image based on the reproduction area for each frame, an image having a second image ratio longer vertically than horizontally; and
a conversion controller configured to enlarge and convert an image having a second image ratio extracted by applying the selected optimal AI model for each subunit.

14. A method performed by an electronic device that transmits a bitstream containing information on an image having a first image ratio that is longer horizontally than vertically to a terminal to enlarge and reproduce the image when the terminal has a screen ratio that is longer vertically than horizontally, the method comprising:
analyzing contents of a corresponding frame image for each frame of the image to calculate a reproduction area corresponding to a part of the corresponding frame image;
separating the image into a plurality of subunits, and selecting an optimal artificial intelligence (AI) model applied for each subunit according to the contents of the image within the corresponding subunit from among a plurality of AI models previously trained for each type of contents of the image; and
generating the bitstream including information on the image, the reproduction area, and the optimal AI model, respectively.

15. A method performed in an electronic device that enlarges and reproduces an image having a first image ratio that is longer horizontally than vertically in a screen ratio that is longer vertically than horizontally, the method comprising:

analyzing contents of a corresponding frame image for each frame of the image to calculate a reproduction area corresponding to a part of the corresponding frame image;

separating the image into a plurality of subunits, and selecting an optimal artificial intelligence (AI) model applied for each subunit according to the contents of the image within the corresponding subunit from among a plurality of AI models previously trained for each type of contents of the image; and extracting, from the image based on the reproduction area for each frame, an image having a second image ratio longer vertically than horizontally, and enlarging and converting an image having a second image ratio extracted by applying the selected optimal AI model for each subunit.

* * * * *